United States Patent
Gotanda et al.

(10) Patent No.: US 10,977,544 B2
(45) Date of Patent: Apr. 13, 2021

(54) COMMODITY REGISTRATION SUPPORTING DEVICE AND COMPUTER PROGRAM

(71) Applicant: TOSHIBA TEC KABUSHIKI KAISHA, Tokyo (JP)

(72) Inventors: Tsuyoshi Gotanda, Ota Tokyo (JP); Hajime Hata, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/450,177

(22) Filed: Jun. 24, 2019

(65) Prior Publication Data
US 2019/0392278 A1     Dec. 26, 2019

(30) Foreign Application Priority Data
Jun. 25, 2018   (JP) .............................. JP2018-120084

(51) Int. Cl.
*G06K 19/077* (2006.01)
*G06K 7/10* (2006.01)
*H04W 4/35* (2018.01)
*G06Q 30/06* (2012.01)

(52) U.S. Cl.
CPC ... *G06K 19/07758* (2013.01); *G06K 7/10475* (2013.01); *G06Q 30/0633* (2013.01); *H04W 4/35* (2018.02)

(58) Field of Classification Search
CPC ......... G06K 19/07758; G06K 7/10475; G06K 7/10396; G06K 7/10009; H04W 4/35; G06Q 30/0633
See application file for complete search history.

(56) References Cited

U.S. PATENT DOCUMENTS

| | | | |
|---|---|---|---|
| 9,400,994 B2* | 7/2016 | Cancro | G06Q 30/0631 |
| 9,892,449 B2* | 2/2018 | Ishikawa | G06Q 30/0633 |
| 10,242,340 B2* | 3/2019 | Douglas | G07G 1/009 |
| 2008/0167964 A1* | 7/2008 | Chefalas | G06Q 30/0216 705/14.23 |
| 2016/0314419 A1* | 10/2016 | White | H04W 4/80 |
| 2017/0186072 A1* | 6/2017 | Clark | G06Q 30/0633 |
| 2018/0060618 A1* | 3/2018 | Ferrer Alos | G06Q 20/208 |

FOREIGN PATENT DOCUMENTS

JP        2011-203058 A       10/2011

* cited by examiner

*Primary Examiner* — Seung H Lee
(74) *Attorney, Agent, or Firm* — Foley & Lardner LLP

(57) ABSTRACT

A commodity registration supporting device according to an embodiment includes a receiver, an acquiring section, a first detecting section, an adding section, and an output section. The receiver receives an electromagnetic wave transmitted from a first transmitter provided in a display place where a commodity is displayed. The acquiring section acquires, from the electromagnetic wave received by the receiver, identification information of the commodity displayed in the display place where the first transmitter that transmits the electromagnetic wave is provided. The first detecting section detects a first act of a purchaser taking out the commodity from the display place and storing the commodity in a storage body. The adding section adds, if first act is detected by the first detecting section, the commodity identified by the identification information acquired by the acquiring section to a list. The output section outputs the list.

17 Claims, 14 Drawing Sheets

*FIG. 13*

| COMMODITY NAME | NUMBER OF ARTICLES | PRICE |
|---|---|---|
| AAAAA | 1 | ¥100 |
| BBBBB | 1 | ¥200 |
| CCCCC | 2 | ¥600 |

| TOTAL NUMBER OF ARTICLES | 4 | TOTAL AMOUNT | ¥900 |

*FIG. 14*

| |
|---|
| COMMODITY ID, COMMODITY NAME, PRICE, F |
| COMMODITY ID, COMMODITY NAME, PRICE, F |
| COMMODITY ID, COMMODITY NAME, PRICE, F |
| COMMODITY ID, COMMODITY NAME, PRICE, F |
| ⋮ |

COMMODITY REGISTRATION SUPPORTING DEVICE AND COMPUTER PROGRAM

CROSS-REFERENCE TO RELATED APPLICATION

This application is based upon and claims the benefit of priority from Japanese Patent Application No. 2018-120084, filed in Jun. 25, 2018, the entire contents of which are incorporated herein by reference.

FIELD

Embodiments described herein relate generally to a commodity registration supporting device and a computer program.

BACKGROUND

In recent years, a commodity registration supporting system has been developed that supports, using a cart terminal, sales registration of commodities purchased by a customer. The cart terminal includes a barcode reader or a wireless tag reader and is attached to a shopping cart. The shopping cart is hereinafter referred to as cart. When putting a commodity in the cart, the customer causes the barcode reader or the wireless tag reader to read data of a barcode or a wireless tag attached to the commodity. Consequently, a list of commodities stored in the cart is created. Identification information for identifying the cart terminal or the customer is associated with the list. The list may be created by the cart terminal or may be created by a server connected to the cart terminal by wireless communication.

In accounting in a Point of Sale (POS) terminal, the customer inputs the identification information of the cart terminal or the customer to the POS terminal. Consequently, in the POS terminal, sales registration processing of the commodities is executed based on information described in the list associated with the identification information. The commodity registration supporting system using the cart terminal in the past is based on the premise that a barcode or a wireless tag is attached to each one of commodities. If barcodes or wireless tags are not attached to commodities, a purchaser has to select a commodity to be purchased from a commodity list displayed on a touch panel of the cart terminal. Therefore, a burden on the customer increases. However, for example, if a wireless tag is attached to each one of commodities, expenses related to wireless tags are enormous.

Related art is described in, for example, JP-A-2011-203058.

DESCRIPTION OF THE DRAWINGS

FIG. 13 is a schematic diagram illustrating an attachment example of a cart tag;

FIG. 14 is a schematic diagram illustrating the structure of purchased commodity data stored in a purchased commodity memory in the second embodiment;

DETAILED DESCRIPTION

Embodiments described herein related to providing a commodity registration supporting device and a computer program that can efficiently support commodity registration by a purchaser at low cost.

A commodity registration supporting device according to an embodiment includes a receiver, an acquiring section, a first detecting section, an adding section, and an output section. The receiver receives an electromagnetic wave transmitted from a first transmitter provided in a display place where a commodity is displayed. The acquiring section acquires, from the electromagnetic wave received by the receiver, identification information of the commodity displayed in the display place where the first transmitter that transmits the electromagnetic wave is provided. The first detecting section detects a first act of a purchaser taking out the commodity from the display place and storing the commodity in a storage body. The adding section adds, if first act is detected by the first detecting section, the commodity identified by the identification information acquired by the acquiring section to a list. The output section outputs the list.

Commodity registration supporting devices in embodiments that can efficiently support commodity registration by a purchaser at low cost are explained with reference to the drawings. The embodiments are applied to a store adopting an accounting system in which a purchaser picks up commodities that the purchaser is about to purchase out of commodities displayed in a commodity shelf and stores the commodities in a storage body such as a cart or a shopping basket and, when ending shopping, moves to an accounting place where a POS terminal is set and pays a price of the purchased commodities.

First Embodiment

First, a first embodiment is explained with reference to FIGS. 1 to 11.

Figure 1:
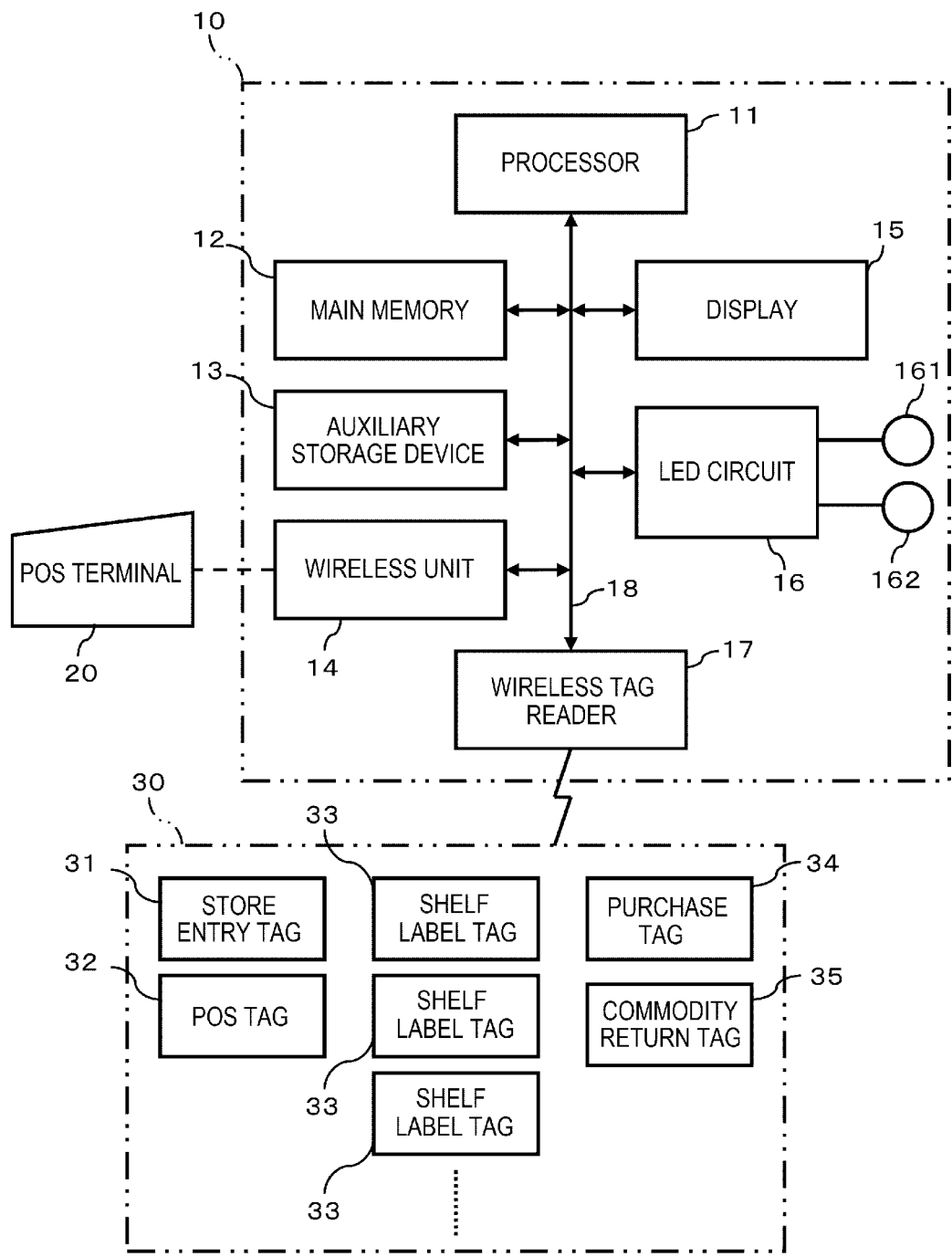
FIG. 1 is a block diagram illustrating a main part circuit configuration of a commodity registration supporting device in a first embodiment.

FIG. 1 is a block diagram illustrating a main part circuit configuration of a commodity registration supporting device 10 in the first embodiment. The commodity registration supporting device 10 is a wearable computer that a purchaser can wear and carry. Specifically, the commodity registration supporting device 10 is formed in a wristwatch shape and is attached to a wrist of the purchaser.

The commodity registration supporting device 10 includes a processor 11, a main memory 12, an auxiliary storage device 13, a wireless unit 14, a display 15, a light emitting diode (LED) circuit 16, a wireless tag reader 17, and a system transmission line 18. The system transmission line 18 includes an address bus, a data bus, and a control signal line. In the commodity registration supporting device 10, the processor 11, the main memory 12, the auxiliary storage device 13, the wireless unit 14, the display 15, the LED circuit 16, and the wireless tag reader 17 are connected to the system transmission line 18. In the commodity registration supporting device 10, a computer is configured by the processor 11, the main memory 12, and the auxiliary storage device 13, and the system transmission line 18 that connects the processor 11, the main memory 12, and the auxiliary storage device 13.

The processor 11 is equivalent to a central part of the computer. The processor 11 controls the sections according to an operating system or application programs in order to realize various functions of the commodity registration supporting device 10. The processor 11 is, for example, a central processing unit (CPU).

The main memory 12 is equivalent to a main storage portion of the computer. The main memory 12 includes a nonvolatile memory region and a volatile memory region. The main memory 12 stores the operating system or the application programs in the nonvolatile memory region. The main memory 12 sometimes stores, in the nonvolatile or volatile memory region, data necessary for the processor 11 in executing processing for controlling the sections. The main memory 12 uses the volatile memory region as a work area where data is rewritten as appropriate by the processor 11. The nonvolatile memory region is, for example, a read only memory (ROM). The volatile memory region is, for example, a random access memory (RAM).

The auxiliary storage device 13 is equivalent to an auxiliary storage portion of the computer. For example, an electric erasable programmable read-only memory (EEPROM), a hard disk drive (HDD), or a solid state drive (SSD) can be the auxiliary storage device 13. The auxiliary storage device 13 saves data used by the processor 11 in performing various kinds of processing, data created by the processing in the processor 11, and the like. The auxiliary storage device 13 sometimes stores the application programs described above.

The wireless unit 14 performs data communication with a POS terminal 20 through a wireless local area network (LAN) that adopts a standard such as Wi-Fi (registered trademark). The POS terminal 20 is usually set in an accounting place of a store. A store clerk in charge of accounting, so-called cashier, operates the POS terminal 20, performs sales registration of commodities purchased by a customer, and further performs accounting processing to settle a transaction with the customer. The wireless unit 14 may directly perform the data communication with the POS terminal 20. The wireless unit 14 may perform the data communication with the POS terminal 20 via a base station. The wireless unit 14 may perform the data communication with the POS terminal 20 via a server connected to the base station. The wireless unit 14 may perform wireless communication with an electronic apparatus other than the POS terminal 20.

The display 15 is a display device of the commodity registration supporting device 10. The display 15 is capable of displaying commodity names, prices, and the like. As the display 15, a liquid crystal display, an organic electro luminescence (EL) display, or the like is used. The display 15 may have a touch panel function.

The LED circuit 16 controls lighting and extinction of a first LED 161 and a second LED 162. The first LED 161 and the second LED 162 have different light emission colors. The light emission colors are not particularly limited. For example, the first LED 161 may be a red LED and the second LED 162 may be a yellow LED. An LED of another color may be used as the first LED 161 or the second LED 162. The number of LEDs controlled by the LED circuit 16 are not limited to two. The LED circuit 16 may control lighting and extinction of only one LED or three or more LEDs.

The wireless tag reader 17 reads data of an integrated circuit (IC) memory included in a wireless tag 30 through noncontact wireless communication between the wireless tag reader 17 and the wireless tag 30. The wireless tag reader 17 includes an antenna. If the antenna approaches approximately 20 cm from an antenna of the wireless tag 30, the wireless tag reader 17 reads data of the wireless tag 30 with an electromagnetic induction system.

The wireless tag 30 is a type of a transmitter that transmits an electromagnetic wave. The wireless tag 30 is referred to as radio frequency identification (ID), electronic tag, IC tag, and the like as well. In this embodiment, a peculiar name is attached to the wireless tag 30 according to a use. That is, in this embodiment, a store entry tag 31, a POS tag 32, a shelf label tag 33, a purchase tag 34, and a commodity return tag 35 are used. The store entry tag 31 is provided near an entrance of the store. The store entry tag 31 transmits an electromagnetic wave including data indicating entry of the purchaser into the store. Content of the data is not particularly limited. In short, the processor 11 of the commodity registration supporting device 10, which reads the data of the store entry tag 31 via the wireless tag reader 17, only has to be able to specify that the data is the data of the store entry tag 31. An attachment place of the store entry tag 31 is desirably a place where the wireless tag reader 17 can read the data of the store entry tag 31 according to an act of a purchaser, who wears the commodity registration supporting device 10, taking out a cart or a shopping basket placed near the store entrance. The attachment place of the store entry tag 31 may be a place where the wireless tag reader 17 can read the data of the store entry tag 31 if the purchaser brings the worn commodity registration supporting device 10 close to the store entry tag 31 in the act of taking out the cart or the shopping basket.

The POS tag 32 is provided for each POS terminal 20. The POS tag 32 transmits an electromagnetic wave including identification information for identifying the POS terminal 20. The identification information of this type is hereinafter referred to as POS ID. The POS ID is different for each POS terminal 20. A data structure of the POS ID is not particularly limited. In short, the processor 11 of the commodity registration supporting device 10, which reads data of the POS tag 32 via the wireless tag reader 17, only has to be able to identify the POS terminal 20. An attachment place of the POS tag 32 is desirably a place where the wireless tag reader 17 can read the data of the POS tag 32 if the purchaser wearing the commodity registration supporting device 10 arrives at the accounting place to perform settlement. The attachment place of the POS tag 32 may be a place where the wireless tag reader 17 can read the data of the POS tag 32 if the purchaser brings the worn commodity registration supporting device 10 close to the POS tag 32 when the purchaser arrives at the accounting place.

Figure 2:
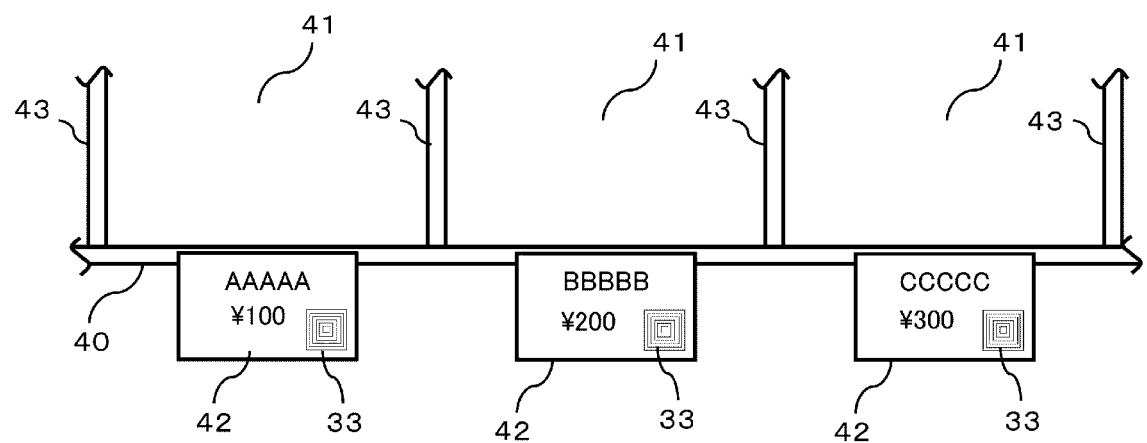
FIG. 2 is a schematic diagram illustrating an attachment example of shelf label tags.

As illustrated in FIG. 2, the shelf label tag 33 is provided for each of shelf labels 42 respectively provided in sections 41 of a commodity shelf 40 in which commodities are displayed. The commodity shelf 40 is divided into a plurality of sections 41 by partition plates 43. Commodities of one article are displayed in each of the sections 41. That is, the section 41 is a display place of the commodity. The shelf label 42 displays a commodity name, a price, and the like of the commodity displayed in the section 41 in which the shelf label 42 is provided. The shelf label 42 is desirably an electronic shelf label. The shelf label 42 may be a shelf label of a paper label type. The partition plate 43 may be absent if commodities displayed in sections adjacent to each other are not mixed.

The shelf label tag 33 transmits an electromagnetic wave including data related to a commodity displayed in the section 41 corresponding to the shelf label tag 33. The data includes identification information, a commodity name, and a price of the commodity. The identification information of the commodity is hereinafter referred to as commodity ID. The commodity ID is different for each article of the commodity. A data structure of the commodity ID is not particularly limited. In short, the processor 11 of the commodity registration supporting device 10, which reads the data of the shelf label tag 33 via the wireless tag reader 17, only has to be able to identify the commodity. An attachment place of the shelf label tag 33 is desirably a place where the wireless tag reader 17 can read the data of the shelf label tag 33 according to an act of the purchaser stretching a hand to the commodity shelf 40 in order to take out a commodity from the section 41. The attachment place of the shelf label tag 33 may be a place where the wireless tag reader 17 can read the data of the shelf label tag 33 if the purchaser brings the worn commodity registration supporting device 10 close to the shelf label tag 33 when taking out the commodity from the section 41.

Figure 3:
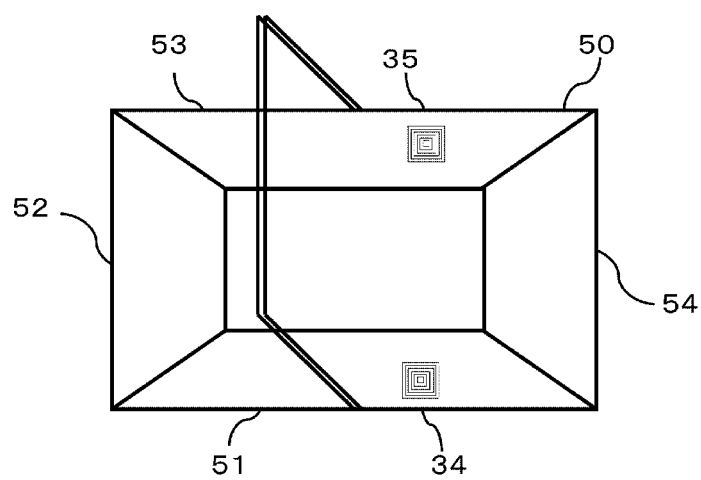
FIG. 3 is a schematic diagram illustrating an attachment example of a purchase tag and a commodity return tag.

As illustrated in FIG. 3, the purchase tag 34 and the commodity return tag 35 are provided in a shopping basket 50. The shopping basket 50 functions as a storage body for the purchaser to store and carry commodities to be purchased. The purchase tag 34 transmits an electromagnetic wave including data indicating that the commodities stored in the shopping basket 50 are purchased commodities. Content of the data is not particularly limited. In short, the processor 11 of the commodity registration supporting device 10, which reads the data of the purchase tag 34 via the wireless tag reader 17, only has to be able to specify that the data is the data of the purchase tag 34. The commodity return tag 35 transmits a radio wave including data indicating that a commodity taken out from the shopping basket 50 is a returned commodity. Content of the data is not particularly limited. In short, the processor 11 of the commodity registration supporting device 10, which reads the data of the commodity return tag 35 via the wireless tag reader 17, only has to be able to specify that the data is the data of the commodity return tag 35. In FIG. 3, the purchase tag 34 is provided on the outer side of one side surface 51 among four side surfaces 51, 52, 53, and 54 forming the shopping basket 50. The commodity return tag 35 is provided on the outer side of the side surface 53 opposed to the side surface 51. Attachment places of the purchase tag 34 and the commodity return tag 35 are not limited to the places illustrated in FIG. 3. The attachment place of the purchase tag 34 is desirably a place where the wireless tag reader 17 can read the data of the purchase tag 34 according to an act of the purchaser, who wears the commodity registration supporting device 10, putting a commodity taken out from the commodity shelf 40 in the shopping basket 50. The attachment place of the purchase tag 34 may be a place where the wireless tag reader 17 can read the data of the purchase tag 34 if the purchaser brings the worn commodity registration supporting device 10 close to the purchase tag 34 when putting the commodity in the shopping basket 50. The attachment place of the commodity return tag 35 is desirably a place where the wireless tag reader 17 can read the data of the commodity return tag 35 according to an act of the purchaser, who wears the commodity registration supporting device 10, taking out the commodity from the shopping basket 50. The attachment place of the commodity return tag 35 may be a place where the wireless tag reader 17 can read the data of the commodity return tag 35 if the purchaser brings the worn commodity registration supporting device 10 close to the commodity return tag 35 when taking out the commodity from the shopping basket 50.

The shelf label tag 33 functions as a first transmitter. The purchase tag 34 functions as a second transmitter. The commodity return tag 35 functions as a third transmitter. The wireless tag reader 17 functions as a receiver.

Figure 4:
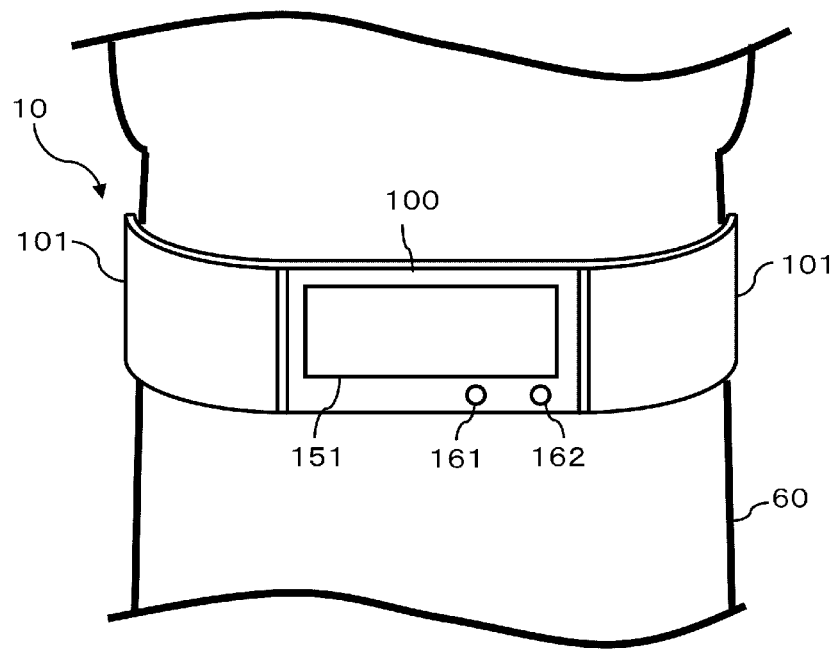
FIG. 4 is a schematic diagram illustrating an example in which a purchaser wears a commodity registration supporting device of a wristwatch type.

FIG. 4 is a schematic diagram illustrating an example in which the purchaser wears the commodity registration supporting device 10 of a wristwatch type. The commodity registration supporting device 10 is formed by a thin rectangular housing 100 and belts 101 respectively attached to a pair of short sides of the housing 100. The purchaser can wear the commodity registration supporting device 10 by winding the belts 101 near a wrist 60.

The processor 11, the main memory 12, the auxiliary storage device 13, the wireless unit 14, the display 15, the LED circuit 16, the wireless tag reader 17, and the like are mounted on the housing 100. A screen 151 of the display 15, the first LED 161, and the second LED 162 are disposed on the surface of the housing 100. A positional relation among the screen 151 of the display 15, the first LED 161, and the second LED 162 is not limited to a positional relation illustrated in FIG. 4. In short, the positional relation only has to be a positional relation with which the purchaser wearing the commodity registration supporting device 10 can easily confirm display content.

Figure 5:
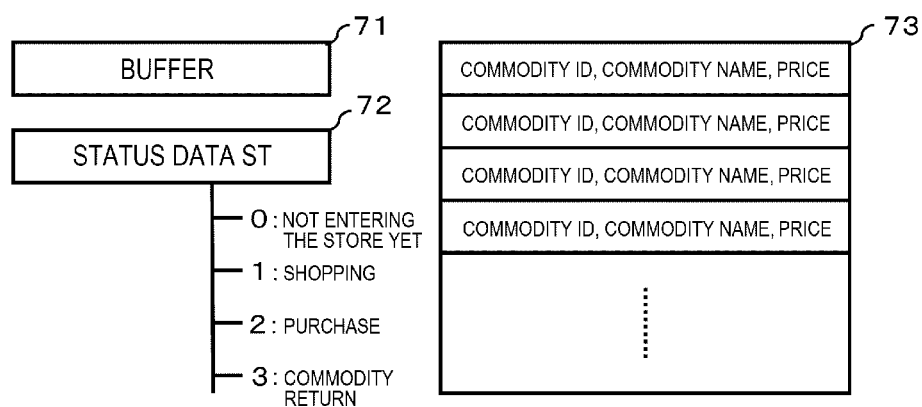
FIG. 5 is a schematic diagram illustrating a main memory area of the commodity registration supporting device.
Figure 6:
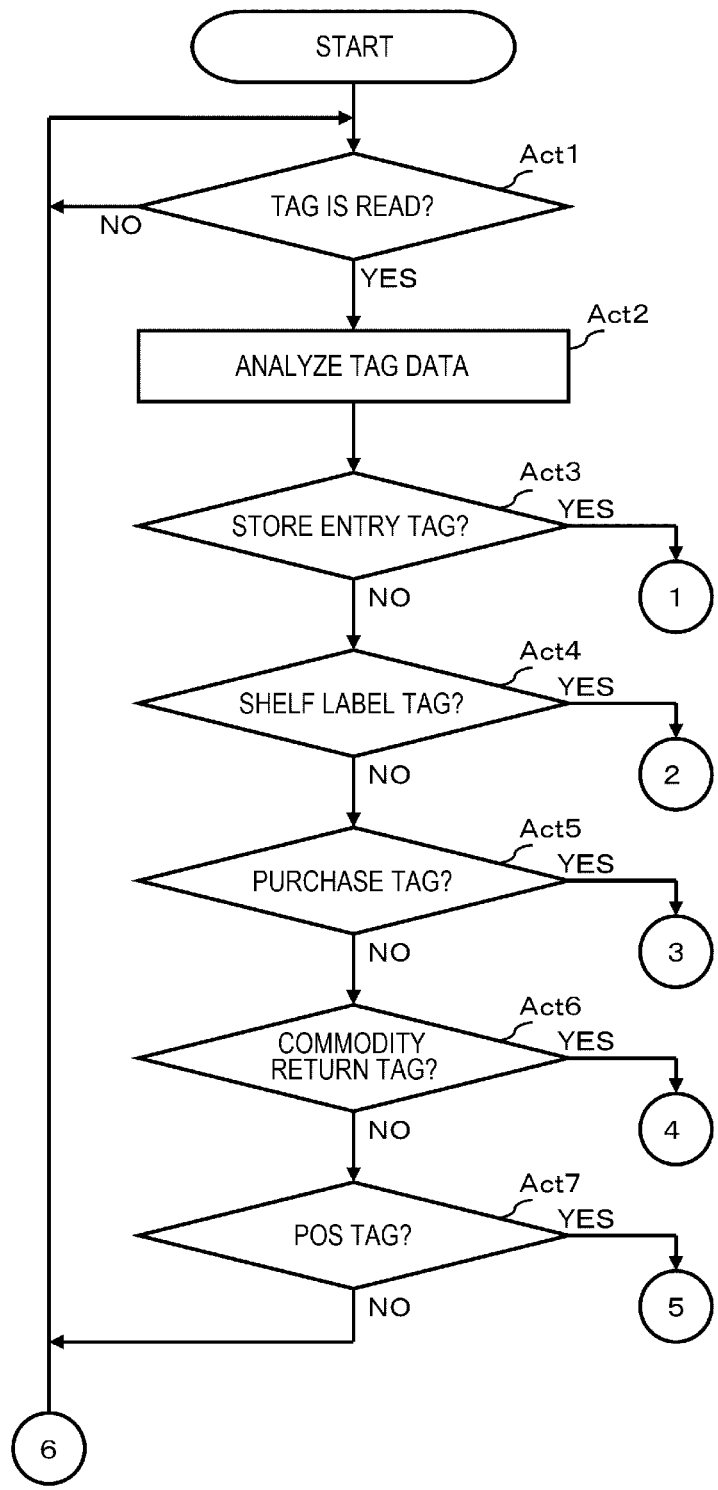
FIG. 6 is a flowchart illustrating a main part procedure of information processing executed by a processor according to a commodity registration supporting program in the first embodiment.

In the commodity registration supporting device 10, as illustrated in FIG. 5, a buffer memory 71, a status memory 72, and a purchased commodity memory 73 are formed in a volatile region of the main memory 12 in order to enable the commodity registration supporting device 10 to efficiently support commodity registration by the purchaser at low cost. The buffer memory 71 is a region for temporarily storing data read from the wireless tag 30 via the wireless tag reader 17. The status memory 72 is a region for storing status data ST indicating a state of the purchaser. The status data ST includes "0" indicating not entering the store yet, "1" indicating shopping, "2" indicating purchase, and "3" indicating commodity return. The purchased commodity memory 73 can store a plurality of purchased commodity data such as commodity IDs, commodity names, and prices. That is, the purchased commodity memory 73 is a region for storing a list of the purchased commodity data.

The processor 11 uses the buffer memory 71, the status memory 72, and the purchased commodity memory 73 when executing information processing according to a commodity registration supporting program. The commodity registration supporting program is a type of an application program stored in the main memory 12 or the auxiliary storage device 13.

FIGS. 6 to 11 are flowcharts illustrating a main part procedure of information processing executed by the processor 11 according to the commodity registration supporting program. A main operation of the commodity registration supporting device 10 is explained below with reference to the flowcharts of FIGS. 6 to 11. The operation explained below is an example. A procedure and content of the operation are not particularly limited if the same result can be obtained.

In Act 1, the processor 11 confirms whether the data of the wireless tag 30 is read. If the data of the wireless tag 30 is not read, the processor 11 determines NO in Act 1 and returns to Act 1. That is, the processor 11 continues to wait for the data of the wireless tag 30 to be read.

If the data of the wireless tag 30 is read via the wireless tag reader 17, the processor 11 determines YES in Act 1 and proceeds to Act 2. In Act 2, the processor 11 analyzes the data of the wireless tag 30. In Act 3, the processor 11 confirms whether the analyzed data is the data of the store entry tag 31. If the analyzed data is not the data of the store entry tag 31, the processor 11 determines NO in Act 3 and proceeds to Act 4. In Act 4, the processor 11 confirms whether the analyzed data is the data of the shelf label tag 33. If the analyzed data is not the data of the shelf label tag 33, the processor 11 determines NO in Act 4 and proceeds to Act 5. In Act 5, the processor 11 confirms whether the analyzed data is the data of the purchase tag 34. If the analyzed data is not the data of the purchase tag 34, the processor 11 determines NO in Act 5 and proceeds to Act 6. In Act 6, the processor 11 confirms whether the analyzed data is the data of the commodity return tag 35. If the analyzed data is not the data of the commodity return tag 35, the processor 11 determines NO in Act 6 and proceeds to Act 7. In Act 7, the processor 11 confirms whether the analyzed data is the data of the POS tag 32. If the analyzed data is not the data of the POS tag 32, the processor 11 determines NO in Act 7 and returns to Act 1. That is, if the processor 11 reads the data of the wireless tag 30 other than the store entry tag 31, the shelf label tag 33, the purchase tag 34, the commodity return tag 35, and the POS tag 32, the processor 11 discards the analyzed data and continues to wait for the data of the wireless tag 30 to be read again.

The purchaser coming to the store attaches the commodity registration supporting device 10 near the wrist as illustrated in FIG. 4. The store may lend or may sell the commodity registration supporting device 10 to the purchaser. The purchaser wearing the commodity registration supporting device 10 takes out the shopping basket 50 from a pile of the shopping baskets 50 stacked near the store entrance. In such an act of the purchaser, the commodity registration supporting device 10 reads the data of the store entry tag 31 with the wireless tag reader 17.

Figure 7:
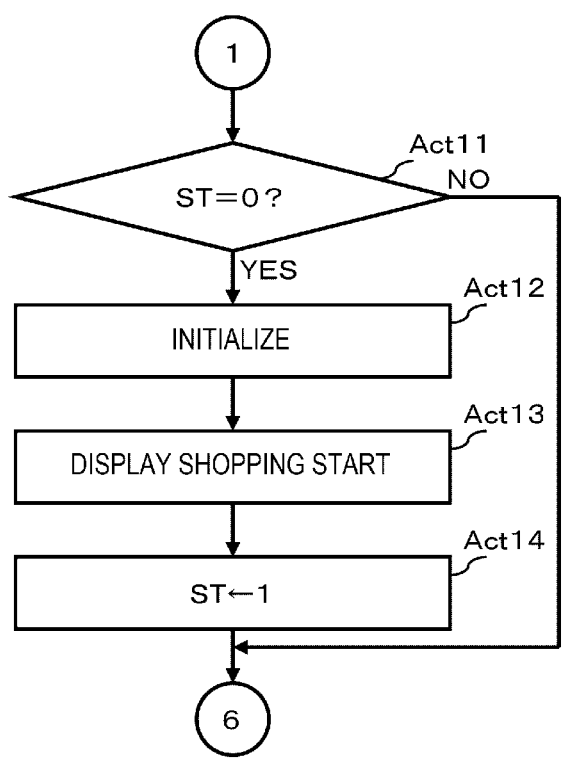
FIG. 7 is a flowchart illustrating the main part procedure.

If the data of the store entry tag 31 is read, the processor 11 determines YES in Act 3 and proceeds to Act 11 in FIG. 7. In Act 11, the processor 11 confirms whether the status data ST described in the status memory 72 is "0" indicating not entering the store yet. If the status data ST is "0", in Act 12, the processor 11 performs initialization. The regions of the buffer memory 71 and the purchased commodity memory 73 are cleared by the initialization.

In Act 13, the processor 11 controls display of a shopping start. For example, the processor 11 controls the LED circuit 16 to cause the first LED 161 and the second LED 162 to alternately perform a flashing operation a plurality of times. For example, the processor 11 controls the display 15 to display guidance for instructing the purchaser to start shopping on the screen 151. In Act 14, the processor 11 changes the status data ST to "1" indicating shopping. Thereafter, the processor 11 returns to Act 1 and continues to wait for the wireless tag 30 to be read.

If the status data ST is not "0" indicating not entering the store yet in act 11, the processor 11 determines NO and skips the processing in Acts 12 to 14. The processor 11 returns to Act 1 and continues to wait for the wireless tag 30 to be read.

If the data of the store entry tag 31 is read by the wireless tag reader 17 in this way, display for instructing the purchaser to start shopping is performed in the commodity registration supporting device 10. Therefore, the purchaser confirming the display holds the shopping basket 50 and starts shopping. At this time, the purchaser may hold the shopping basket 50 with a hand and start shopping or may place the shopping basket 50 on the cart and start shopping.

The purchaser starting the shopping takes out commodities to be purchased from the commodity shelf 40 one by one and puts the commodities in the shopping basket 50. At this time, the purchaser extends the hand attached with the commodity registration supporting device 10 and takes out a commodity from the section 41, which is the display place of the commodity. In such an act of the purchaser, the commodity registration supporting device 10 reads the data of the shelf label tag 33 from the shelf label 42 provided in the section 41 with the wireless tag reader 17.

Figure 8:
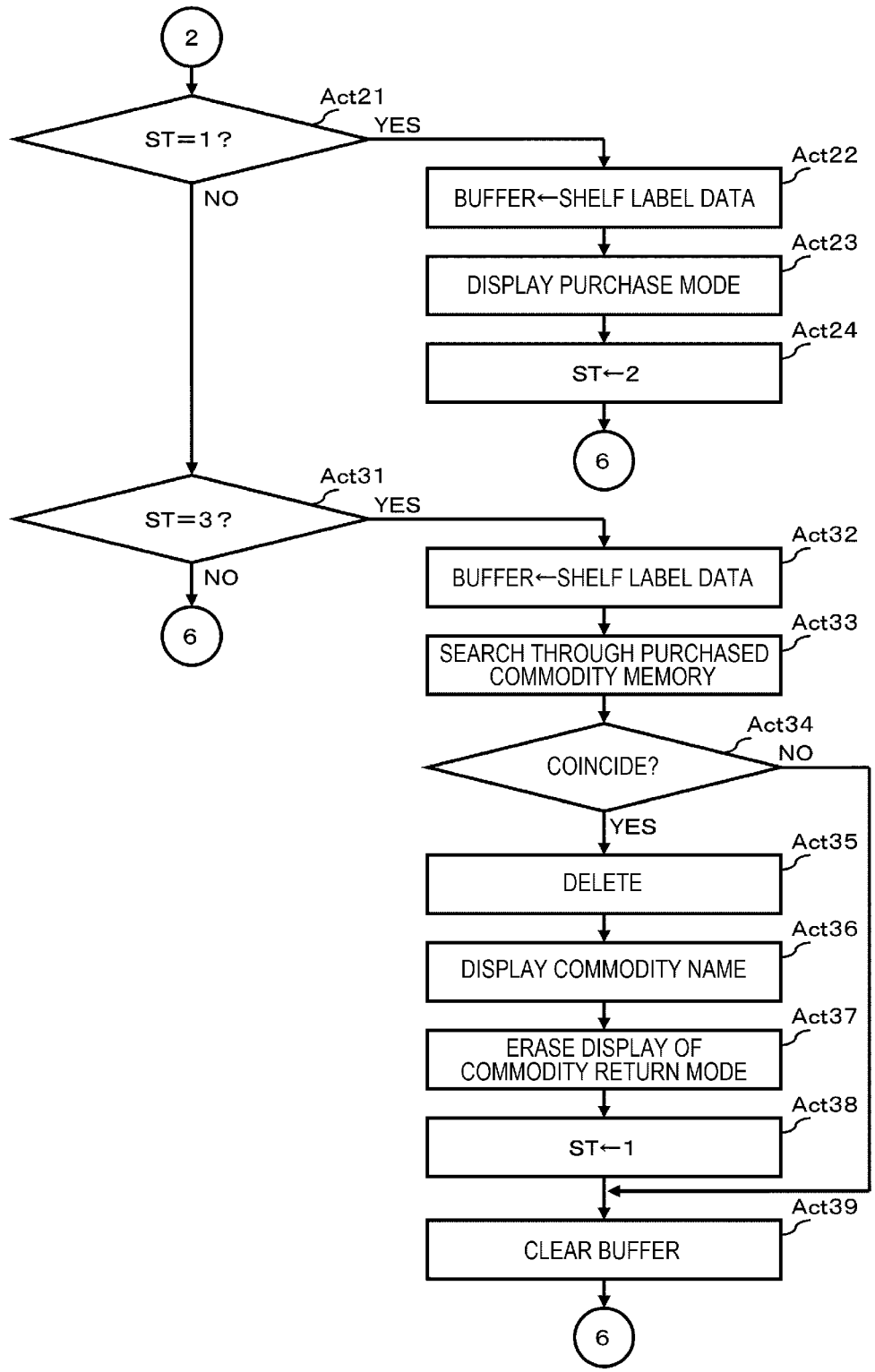
FIG. 8 is a flowchart illustrating the main part procedure.

If the data of the shelf label tag 33 is read, the processor 11 determines YES in Act 4 and proceeds to Act 21 in FIG. 8. In Act 21, the processor 11 confirms whether the status data ST described in the status memory 72 is "1" indicating shopping. If the status data ST is "1", in Act 22, the processor 11 stores the data of the shelf label tag 33 read by the wireless rag reader 17 in the buffer memory 71. The data of the shelf label tag 33 includes a commodity ID, a commodity name, and a price of a commodity displayed on the shelf label 42 attached with the shelf label tag 33.

In Act 23, the processor 11 controls display of a purchase mode. For example, the processor 11 controls the LED circuit 16 to light the first LED 161. In Act 24, the processor 11 changes the status data ST to "2" indicating purchase. Thereafter, the processor 11 returns to Act 1 and continues to wait for the wireless tag 30 to be read. If the status data ST is not "1" indicating shopping in Act 21, the processor 11 determines NO and proceeds to Act 31. Processing in Act 31 and subsequent acts is explained below. The purchaser, who takes out the commodity from the section 41, confirms that the first LED 161 is lit. If the first LED 161 is not lit, the purchaser brings the commodity registration supporting device 10 close to the shelf label 42 and causes the wireless tag reader 17 to read the data of the shelf label tag 33.

The purchaser, who confirms that the first LED 161 is lit, puts the held commodity in the shopping basket 50. In that case, the purchaser puts the commodity in the shopping basket 50 after bringing the commodity registration supporting device 10 close to the purchase tag 34. In such an act of the purchaser, the commodity registration supporting device 10 reads the data of the purchase tag 34 from the shopping basket 50 with wireless tag reader 17.

Figure 9:
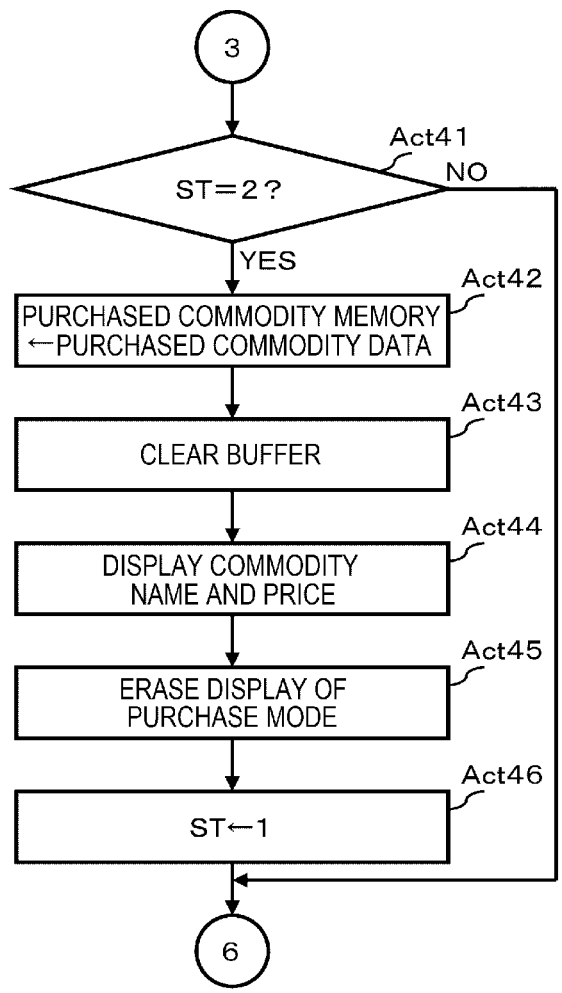
FIG. 9 is a flowchart illustrating the main part procedure.

If the data of the purchase tag 34 is read, the processor 11 determines YES in Act 5 and proceeds to Act 41 in FIG. 9. In Act 41, the processor 11 confirms whether the status data ST described in the status memory 72 is "2" indicating purchase. If the status data ST is "2" indicating purchase, the processor 11 determines YES in Act 41 and proceeds to Act 42. In Act 42, the processor 11 describes, in the purchased commodity memory 73, the data of the shelf label tag 33 described in the buffer memory 71. That is, the processor 11 adds purchased commodity data including a commodity ID, a commodity name, and a price to the purchased commodity memory 73. In Act 43, the processor 11 clears the buffer memory 71.

In Act 44, the processor 11 controls the display 15 to display, on the screen 151, the commodity name and the price of the purchased commodity data added to the purchased commodity memory 73. According to this control, the commodity name and the price of the commodity put in the shopping basket 50 are displayed on the screen 151. In Act 45, the processor 11 controls the display of the purchase mode to be erased. The first LED 161 is extinguished according to this control.

In Act 46, the processor 11 changes the status data ST to "1" indicating shopping. Thereafter, the processor 11 returns to Act 1 and continues to wait for the wireless tag 30 to be read.

If the status data ST is not "2" indicating purchase in Act 41, the processor 11 determines NO and skips the processing in Acts 42 to 46. The processor 11 returns to Act 1 and continues to wait for the wireless tag 30 to be read.

The processor 11 executes the processing in Acts 1, 2, 4, 21, and 22 in this way to thereby acquire, from an electromagnetic wave received by the wireless tag reader 17, the commodity ID of the commodity displayed in the section 41 of the commodity shelf 40 provided with the shelf label tag 33 that transmits the electromagnetic wave. The computer including the processor 11 as the central part functions as an acquiring section. The processor 11 executes the processing in Acts 24, 1, 2, 5, and 41 to thereby detect a first act of the purchaser taking out a commodity from the section 41 and storing the commodity in the shopping basket 50. Specifically, the processor 11 detects the first act according to the wireless tag reader 17 receiving the electromagnetic wave transmitted from the purchase tag 34 after receiving the electromagnetic wave transmitted from the shelf label tag 33. The computer including the processor 11 as the central part functions as a first detecting section.

The processor 11 executes the processing in Act 42 to thereby add, if the first act is detected by the first detecting section, purchased commodity data including a commodity ID, a commodity name, and a price of the commodity identified by the commodity ID acquired by the acquiring section to the purchased commodity memory 73. The computer including the processor 11 as the central part functions as an adding section. The purchaser repeats the first act every time the purchaser finds a commodity to be purchased. Incidentally, the purchaser sometimes returns a commodity once put in the shopping basket 50 to the commodity shelf 40 halfway in shopping. In such a case, the purchaser takes out the commodity to be returned from the shopping basket 50 with the hand attached with the commodity registration supporting device 10. The purchaser brings the commodity registration supporting device 10 close to the commodity return tag 35 of the shopping basket 50. In such an act of the purchaser, the commodity registration supporting device 10 reads the data of the commodity return tag 35 with the wireless tag reader 17.

Figure 10:
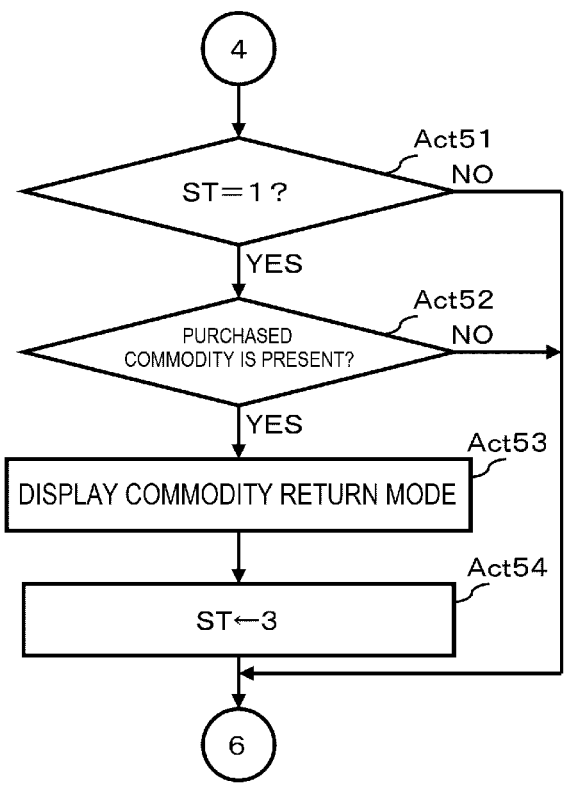
FIG. 10 is a flowchart illustrating the main part procedure.

If the data of the commodity return tag 35 is read, the processor 11 determines YES in Act 6 and proceeds to Act 51 in FIG. 10. In Act 51, the processor 11 confirms whether the status data ST described in the status memory 72 is "1" indicating shopping. If the status data ST is "1" indicating shopping, the processor 11 determines Yes in Act 51 and proceeds to Act 52. In Act 52, the processor 11 confirms whether purchased commodity data is stored in the purchased commodity memory 73.

If purchased commodity data is stored in the purchased commodity memory 73, the processor 11 determines Yes in Act 52 and proceeds to Act 53. In Act 53, the processor 11 controls display of a commodity return mode. For example, the processor 11 controls the LED circuit 16 to light the second LED 162. In Act 54, the processor 11 changes the status data ST to "3" indicating commodity return. Thereafter, the processor 11 returns to Act 1 and continues to wait for the wireless tag 30 to be read.

If the status data ST is not "1" indicating shopping in Act 51, the processor 11 determines NO, skips the processing in Acts 52 to 54, and returns to Act 1. If purchased commodity data is not stored in the purchased commodity memory 73 in Act 52, the processor 11 skips the processing in Acts 53 and 54 and returns to Act 1.

The purchaser, who takes out the commodity to be returned from the shopping basket 50, confirms that the second LED 162 is lit. If the second LED 162 is not lit, the purchaser brings the commodity registration supporting device 10 close to the commodity return tag 35 and causes the wireless tag reader 17 to read the data of the commodity return tag 35.

The purchaser, who confirms that the second LED 162 is lit, stretches a hand to the commodity shelf 40 and returns the commodity to the section 41 corresponding to the commodity. In such an act of the purchaser, the wireless tag reader 17 of the commodity registration supporting device 10 reads the data of the shelf label tag 33 of the shelf label 42 provided in the section 41.

If the data of the shelf label tag 33 is read, the processor 11 determines YES in Act 4 and proceeds to Act 21 in FIG. 8. In Act 21, the processor 11 confirms whether the status data ST described in the status memory 72 is "1" indicating shopping. The status data ST at this time is "3" indicating commodity return. Therefore, the processor 11 determines NO in Act 21 and proceeds to Act 31. In Act 31, the processor 11 confirms whether the status data ST described in the status memory 72 is "3" indicating commodity return.

If the status data ST is "3", the processor 11 determines YES in Act 31 and proceeds to Act 32. In Act 32, the processor 11 stores the data of the shelf label tag 33 read by the wireless tag reader 17 in the buffer memory 71. The data of the shelf label tag 33 includes a commodity ID, a commodity name, and a price of a commodity, the commodity name and the price of which are displayed on the shelf label 42 attached with the shelf label tag 33.

In Act 33, the processor 11 searches through the purchased commodity memory 73 with the data stored in the buffer memory 71. In Act 34, the processor 11 confirms whether purchased commodity data including a commodity ID, a commodity name, and a price coinciding with the data stored in the buffer memory 71 is present in the purchased commodity memory 73.

If purchased commodity data including a commodity ID, a commodity name, a the price coinciding with the data stored in the buffer memory 71 is present, the processor 11 determines YES in Act 34 and proceeds to Act 35. In Act 35, the processor 11 deletes the purchased commodity data including the commodity ID, the commodity name, and the price coinciding with the data stored in the buffer memory 71 from the purchased commodity memory 73. In Act 36, the processor 11 controls the display 15 to display the commodity name of the returned commodity on the screen 151. According to this control, the commodity name of the commodity returned from the shopping basket 50 to the commodity shelf 40 is displayed on the screen 151. In Act 37, the processor 11 controls the display of the commodity return mode to be erased. The second LED 162 is extinguished according to this control.

In Act 38, the processor 11 changes the status data ST to "1" indicating shopping. In Act 39, the processor 11 clears the buffer memory 71. Thereafter, the processor 11 returns to Act 1 and continues to wait for the wireless tag 30 to be read.

If purchased commodity data including a commodity ID, a commodity name, a the price coinciding with the data stored in the buffer memory 71 is absent in Act 34, the processor 11 determines NO in Act 34, skips the processing in Acts 35 to 38, and proceeds to Act 39. In Act 39, the processor 11 clears the buffer memory 71 and returns to Act 1. If the status data ST is not "3" indicating commodity return in Act 31, the processor 11 determines NO and returns to Act 1.

The processor 11 executes the processing in Acts 1, 2, 6, 51, 52, and 54 and the processing in Acts 1, 2, 4, and 31 to thereby detect a second act of the purchaser returning a commodity stored in the shopping basket 50 to the original section 41. Specifically, the processor 11 detects the second act according to the wireless tag reader 17 receiving the electromagnetic wave transmitted from the shelf label tag 33 after receiving the electromagnetic wave transmitted from the commodity return tag 35. The computer including the processor 11 as the central part functions as a second detecting section. The processor 11 executes the processing in Acts 33 to 35 to thereby delete, if the second act is detected by the second detecting section, a commodity identified by a shelf label ID acquired by the acquiring section from the purchased commodity memory 73. The computer including the processor 11 as the central part functions as a deleting section. The purchaser ending the shopping moves to the accounting place to perform settlement. The purchaser brings the commodity registration supporting device 10 close to the POS tag 32 corresponding to the POS terminal 20 set in the accounting place. According to such an act of the purchaser, the commodity registration supporting device 10 reads the data of the POS tag 32 with the wireless tag reader 17.

Figure 11:
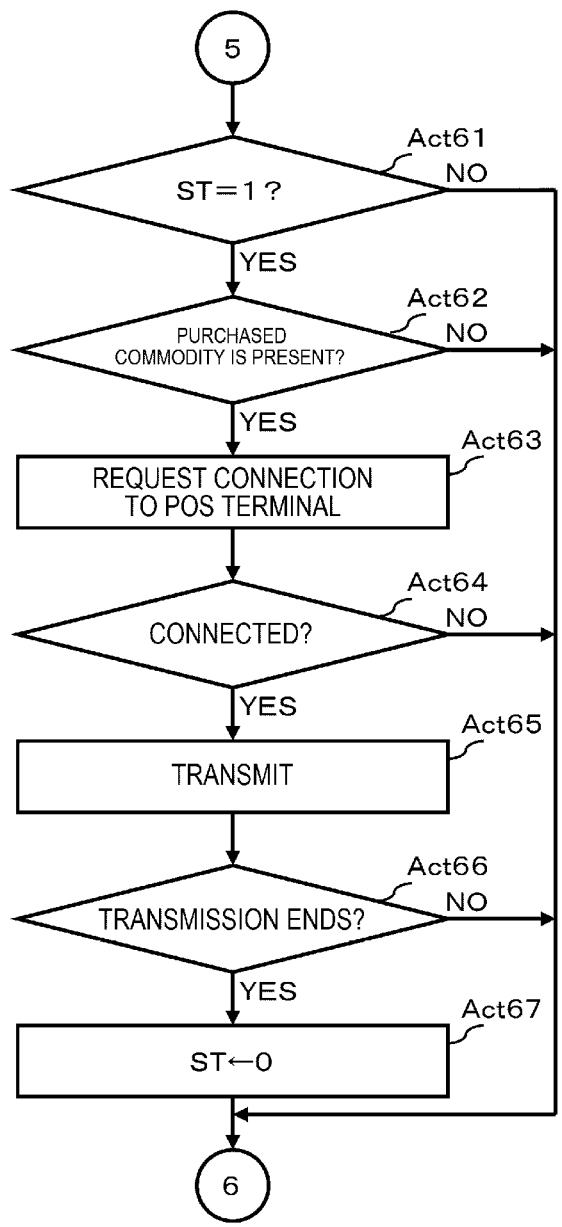
FIG. 11 is a flowchart illustrating the main part procedure.

If the data of the POS tag 32 is read, the processor 11 determines YES in Act 7 and proceeds to Act 61 in FIG. 11. In Act 61, the processor 11 confirms whether the status data ST described in the status memory 72 is "1" indicating shopping. If the status data ST is "1", in Act 62, the processor 11 confirms whether purchased commodity data is stored in the purchased commodity memory 73.

If purchased commodity data is stored in the purchased commodity memory 73, in Act 63, the processor 11 requests the wireless unit 14 to perform connection to the POS terminal 20. According to this connection request, the wireless unit 14 connects a wireless line to the POS terminal 20 identified by the POS ID, which is the data of the POS tag 32.

In Act 64, the processor 11 confirms whether the wireless line to the POS terminal 20 is connected. If the wireless line is connected, the processor 11 determines YES in Act 64 and proceeds to Act 65. In Act 65, the processor 11 controls the wireless unit 14 to transmit the purchased commodity data stored in the purchased commodity memory 73 to the POS terminal 20. According to this control, the wireless unit 14 wirelessly transmits the purchased commodity data to the POS terminal 20.

In Act 66, the processor 11 confirms whether the purchased commodity data is finished being normally transmitted. If the purchased commodity data is finished being normally transmitted, the processor 11 determines YES in Act 66 and proceeds to Act 67. In Act 67, the processor 11 changes the status data ST to "0" indicating not entering the store yet. Thereafter, the processor 11 returns to Act 1 and continues to wait for the wireless tag 30 to be read.

If the purchased commodity data is not finished being normally transmitted, the processor 11 determines NO in Act 66, skips the processing in Act 67, and returns to Act 1. If the processor 11 fails in the line connection to the POS terminal 20, the processor 11 determines NO in Act 64, skips the processing in Acts 65 to 67, and returns to Act 1. If purchased commodity data is not stored in the purchased commodity memory 73, the processor 11 determines NO in Act 62, skips the processing in Acts 63 to 67, and returns to Act 1. If the status data ST is not "1", the processor 11 determines NO in Act 61, skips the processing in Acts 62 to 67, and returns to Act 1.

The processor 11 executes the processing in Acts 1, 2, 7, and 61 to 65 in this way to thereby output the purchased commodity data stored in the purchased commodity memory 73 to the POS terminal 20. The computer including the processor 11 as the central part functions as an output section.

In the POS terminal 20, purchased commodity data received from the commodity registration supporting device 10 is stored in a transaction memory. A list of commodity names, prices, and the like included in the purchased commodity data is displayed on a cashier display. A cashier collates the list and commodities stored in the shopping basket 50. If the list and the commodities in the shopping basket 50 coincide, the cashier operates an accounting key. If the accounting key is operated, in the POS terminal 20, sales registration processing is executed based on the purchased commodity data stored in the transaction memory.

In this way, the purchaser simply performs an inevitable act of taking out a commodity displayed in the commodity shelf 40 with the hand attached with the article registration supporting device 10 near the wrist and storing the commodity in the shopping basket 50, whereby purchased commodity data related to the commodity is stored in the purchased commodity memory 73 of the commodity registration supporting device 10. The purchased commodity data stored in the purchased commodity memory 73 is used for the sales registration processing performed in the POS terminal 20. Moreover, it is unnecessary to attach the wireless tag 30 to each one of commodities displayed in the commodity shelf 40. Even if a barcode is not attached to a commodity such as a perishable food, complicated operation for selecting the commodity out of a commodity list is unnecessary. Therefore, it is possible to provide the commodity registration supporting device 10 that can efficiently support commodity registration by the purchaser at low cost.

If the purchaser takes out a commodity from the commodity shelf 40, the purchaser brings the commodity registration supporting device 10 close to the shelf label tag 33 of the shelf label 42 corresponding to the commodity. Subsequently, if the purchaser stores the commodity in the shopping basket 50, the purchaser brings the commodity registration supporting device 10 close to the purchase tag 34 provided in the shopping basket 50. The purchaser simply performs such an act, whereby purchased commodity data related to the commodity is stored in the purchased commodity memory 73. Therefore, the wireless tags 30 such as the shelf label tag 33 and the purchase tag 34 only have to be provided other than the commodity registration supporting device 10. Therefore, it is possible to easily introduce the commodity registration supporting device 10 to a store such as a supermarket or a convenience store.

The purchaser simply performs an act of taking out a commodity from the shopping basket 50 with the hand attached with the commodity registration supporting device 10 near the wrist and returning the commodity to the original section 41 of the commodity shelf 40, whereby purchased commodity data related to the commodity is deleted from the purchased commodity memory 73 of the commodity registration supporting device 10. Therefore, even if the purchaser cancels purchase of a commodity that the purchaser is once about to purchase, the purchaser only has to perform an act of returning the commodity to the original section 41. This is not a burden for the purchaser. Before returning a commodity from the shopping basket 50 to the commodity shelf 40, the purchaser brings the commodity registration supporting device 10 close to the commodity return tag 35 provided in the shopping basket 50. Subsequently, if the purchaser returns the commodity to the commodity shelf 40, the purchaser brings the commodity registration supporting device 10 close to the shelf label tag 33 of the shelf label 42. The purchaser simply performs such an act, whereby purchased commodity data related to the commodity is deleted from the purchased commodity memory 73. Therefore, simply by providing the commodity return tag 35 in addition to the shelf label tag 33 and the purchase tag 34, it is possible to enable the purchaser to cope with commodity return before settlement by himself or herself.

The purchaser only has to attach the commodity registration supporting device 10 near the wrist and does not need to perform special operation for the commodity registration supporting device 10. Therefore, a burden on the purchaser is extremely small compared with when a commodity registration supporting system is constructed using a cart terminal.

Second Embodiment

A second embodiment is explained with reference to FIGS. 12 to 17. Portions common to the first embodiment are denoted by the same reference numerals and signs. Detailed explanation of such portions is omitted.

Figure 12:
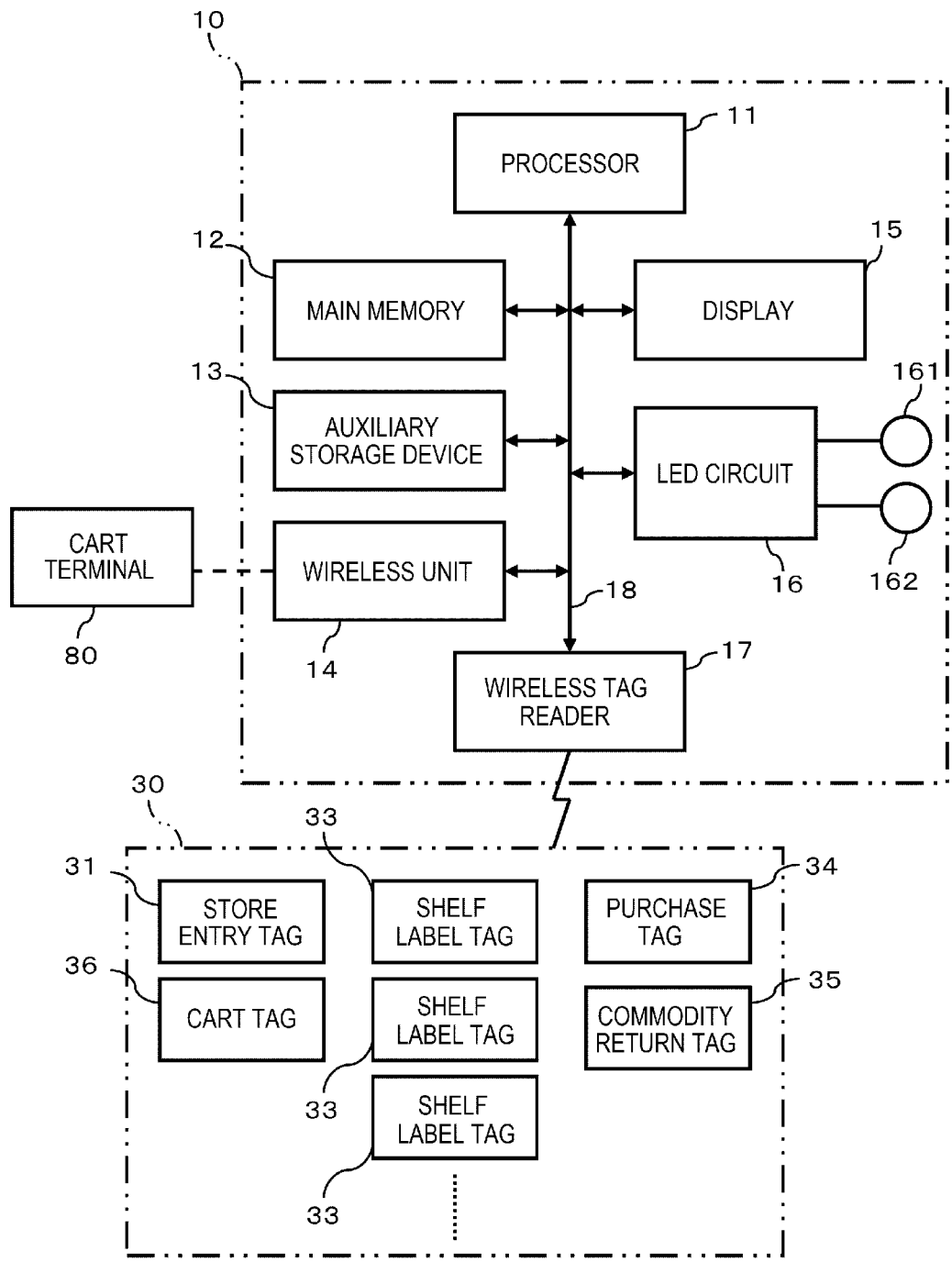
FIG. 12 is a block diagram illustrating a main part circuit configuration of a commodity registration supporting device in a second embodiment.

FIG. 12 is a block diagram illustrating a main part circuit configuration of the commodity registration supporting device 10 in the second embodiment. As it is evident if FIG. 12 is compared with FIG. 1, a hardware configuration of the commodity registration supporting device 10 is common to the first embodiment and the second embodiment. In the first embodiment, a wireless communication apparatus, a wireless line of which is connected to the wireless unit 14, is the POS terminal 20. In the second embodiment, the wireless communication apparatus is a cart terminal 80. In the first embodiment, there is the POS tag 32 as the wireless tag 30 read by the wireless tag reader 17. In the second embodiment, a cart tag 36 is used instead of the POS tag 32.

The cart terminal 80 is a wireless communication apparatus attached to a truck called shopping cart. The cart terminal 80 has a function of receiving purchased commodity data wirelessly transmitted from the commodity registration supporting device 10 and storing the purchased commodity data in a storing section and a function of transferring the purchased commodity data stored in the storing section to the POS terminal 20. The data transfer to the POS terminal 20 may be performed using a wire or may be performed using radio. The purchased commodity data may be transferred to the POS terminal 20 directly or via a server. A well-known wireless communication apparatus such as a smartphone or a tablet terminal is used as the cart terminal 80.

The cart tag 36 is provided in the cart terminal 80. The cart tag 36 transmits an electromagnetic wave including identification information for identifying the cart terminal 80. The information of this type is hereinafter referred to as cart ID. The cart ID is different for each cart terminal 80. A data structure of the cart ID is not particularly limited. In short, the processor 11 of the commodity registration supporting device 10, which reads data of the cart tag 36 via the wireless tag reader 17, only has to be able to identify the cart terminal 80. An attachment place of the cart tag 36 is desirably a place where the wireless tag reader 17 can read the data of the cart tag 36 if a purchaser wearing the commodity registration supporting device 10 brings the commodity registration supporting device 10 close to the cart terminal 80.

FIG. 13 is an example of the cart tag 36 provided in the cart terminal 80. As illustrated in FIG. 13, the cart tag 36 is attached to a part of the same surface as a screen of a display device 81 included in the cart terminal 80.

FIG. 14 is a schematic diagram illustrating the structure of data stored in the purchased commodity memory 73 in the second embodiment. As illustrated in FIG. 14, in the second embodiment, a transmission completion flag F is added to purchased commodity data including a commodity ID, a commodity name, and a price. The transmission completion flag F is one-bit data for identifying whether the purchased commodity data corresponding to the transmission completion flag F is already transmitted to the cart terminal 80. In this embodiment, the transmission completion flag F indicating non-transmission is represented as "0" and the transmission completion flag F indicating transmission completion is represented as "1". "0" and "1" of the transmission completion flag F may be opposite.

Figure 15:
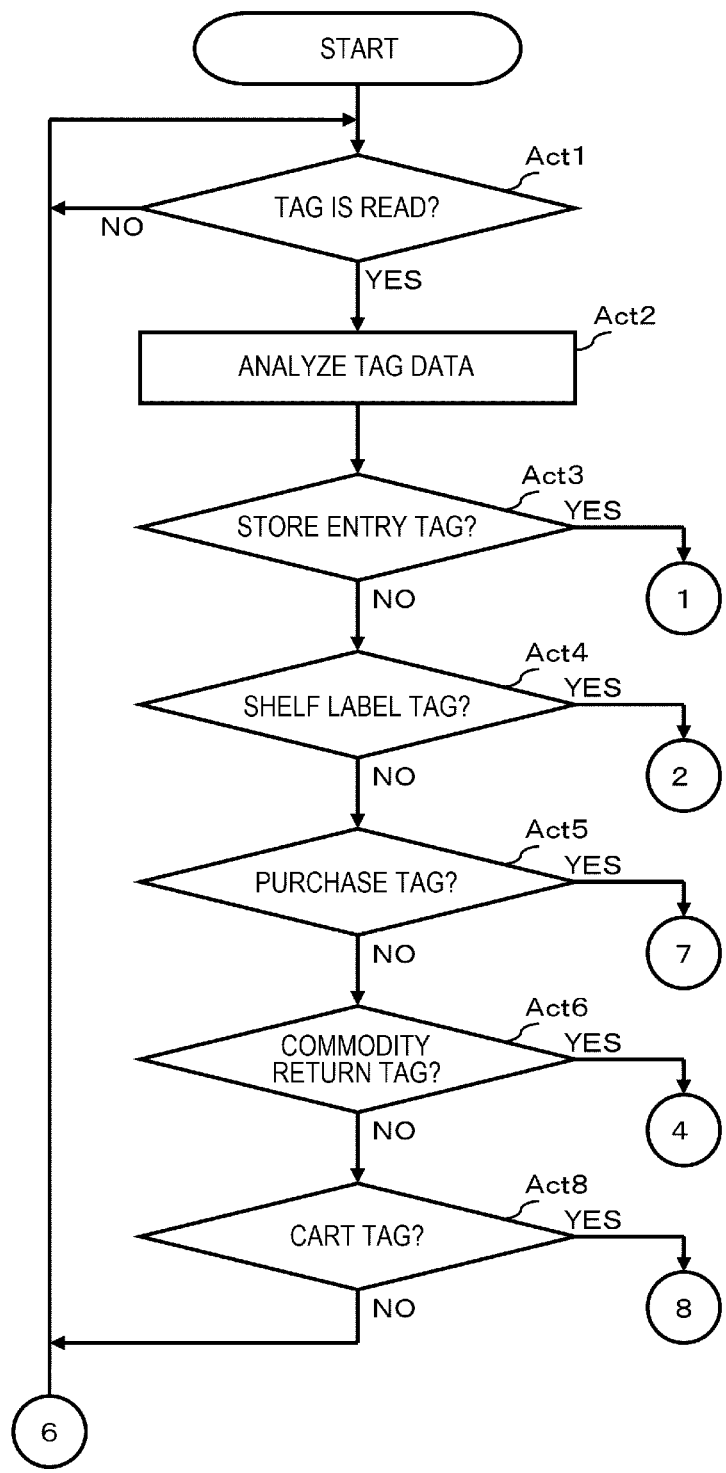
FIG. 15 is a flowchart illustrating a main part procedure of information processing executed by a processor according to a commodity registration supporting program in the second embodiment.
Figure 16:
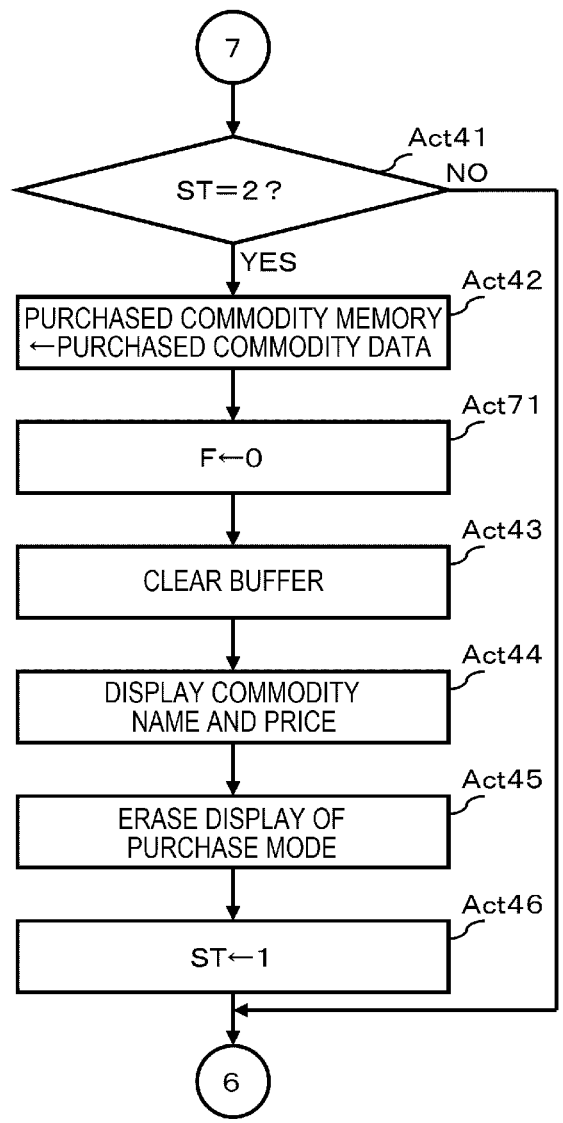
FIG. 16 is a flowchart of the main part procedure.
Figure 17:
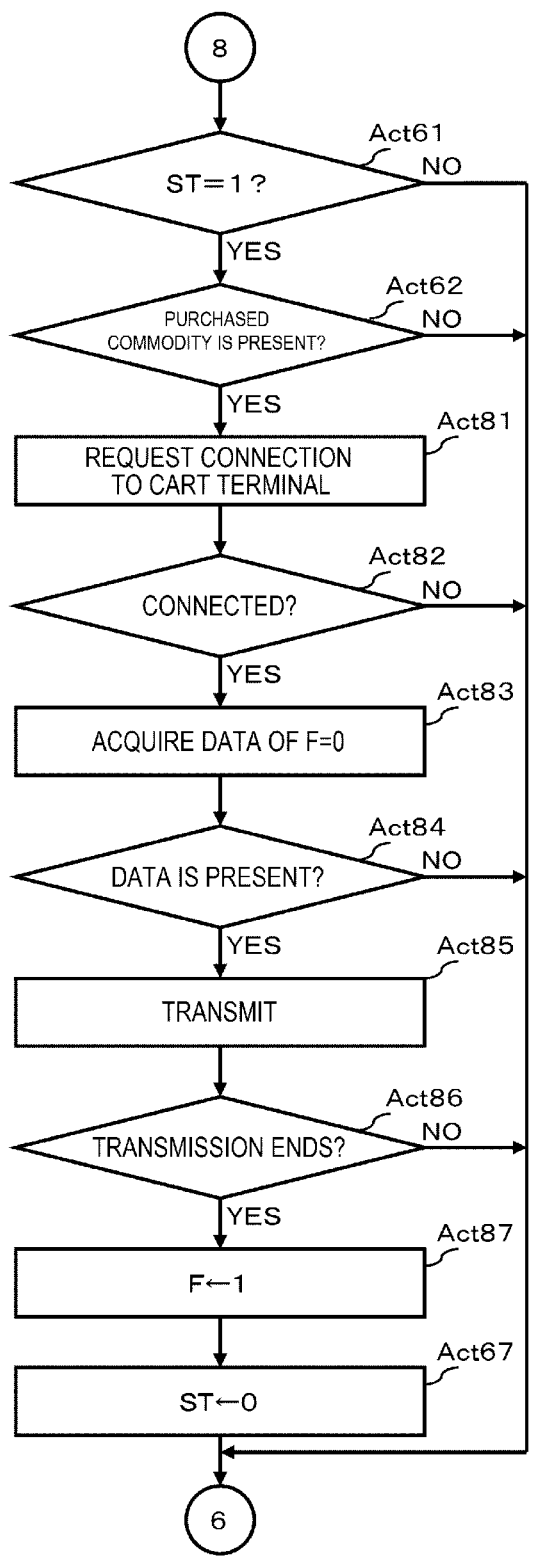
FIG. 17 is a flowchart illustrating the main part procedure.

FIGS. 15 to 17 are flowcharts illustrating a main part procedure of information processing executed by the processor 11 according to a commodity registration supporting program in the second embodiment. Incidentally, FIG. 15 corresponds to FIG. 6 in the first embodiment, FIG. 16 corresponds to FIG. 9 in the first embodiment, and FIG. 17 corresponds to FIG. 11 in the first embodiment. A main operation of the commodity registration supporting device 10 in the second embodiment is hereinafter explained below with reference to the flowcharts of FIGS. 15 to 17. The operation explained below is an example. A procedure and content of the operation are not particularly limited if the same result can be obtained.

In Act 1, the processor 11 continues to wait for data of the wireless tag 30 to be read. If the data of the wireless tag 30 is read via the wireless tag reader 17, in Act 2, the processor 11 analyzes the data of the wireless tag 30. If the analyzed data is data of the store entry tag 31 in Act 3, the processor 11 executes the processing of the procedure illustrated in FIG. 7 as in the first embodiment. If the analyzed data is data of the shelf label tag 33 in Act 4, the processor 11 executes the processing of the procedure illustrated in FIG. 8 as in the first embodiment. If the analyzed data is data of the commodity return tag 35 in Act 6, the processor 11 executes the processing of the procedure illustrated in FIG. 10 as in the first embodiment.

On the other hand, if the analyzed data is data of the purchase flag 34 in Act 5, the processor 11 determines YES in Act 5 and proceeds to Act 41 in FIG. 16. In Act 41, the processor 11 confirms whether the status data ST described in the status memory 72 is "2" indicating purchase. If the status data ST is "2" indicating purchase, in Act 42, the processor 11 describes, in the purchased commodity memory 73, data of the shelf label tag 33 described in the buffer memory 71, that is, purchased commodity data including a commodity ID, a commodity name, and a price. Further, in Act 71, the processor 11 adds the transmission completion flag F indicating non-transmission "0" to the purchased commodity data. Thereafter, in Acts 43 to 46, the processor 11 executes the same processing as the processing in the first embodiment.

If the analyzed data is not the data of the commodity return tag 35 in Act 6, the processor 11 determines NO in Act 6 and proceeds to Act 8. In Act 8, the processor 11 confirms whether the analyzed data is data of the cart tag 36. If the analyzed data is not the data of the cart tag 36, the processor 11 determines NO in Act 8 and returns to Act 1. If the analyzed data is the data of the cart tag 36, the processor 11 determines YES in Act 8 and proceeds to Act 61 in FIG. 17. In Act 61, the processor 11 confirms whether the status data ST described in the status memory 72 is "1" indicating shopping. If the status data ST is "1", in Act 62, the processor 11 confirms whether purchased commodity data is stored in the purchased commodity memory 73.

If purchased commodity data is stored in the purchased commodity memory 73, in Act 81, the processor 11 requests the wireless unit 14 to perform connection to the cart terminal 80. According to this connection request, the wireless unit 14 connects a wireless line to the cart terminal 80 identified by a cart ID, which is the data of the cart tag 36.

In Act 82, the processor 11 confirms whether the wireless line to the cart terminal 80 is connected. If the wireless line is connected, the processor 11 determines YES in Act 82 and proceeds to Act 83. In Act 83, the processor 11 acquires purchased commodity data, the transmission completion flag F of which is set to non-transmission "0", out of the purchased commodity data stored in the purchased commodity memory 73.

In Act 84, the processor 11 confirms presence or absence of purchased commodity data, the transmission completion flag F of which is set to non-transmission "0". If the pertinent purchased commodity data is present, the processor 11 determines YES in Act 84 and proceeds to Act 85. In Act 85, the processor 11 controls the wireless unit 14 to transmit the pertinent purchased commodity data to the cart terminal 80. According to this control, the wireless unit 14 wirelessly transmits the purchased commodity data, the transmission completion flag F of which is set to the non-transmission "0", to the cart terminal 80.

In Act 86, the processor 11 confirms whether the purchased commodity data is finished being normally transmitted. If the purchased commodity data is finished being normally transmitted, the processor 11 determines YES in Act 86 and proceeds to Act 87. In Act 87, the processor 11 changes all the transmission completion flags F added to the purchased commodity data stored in the purchased commodity memory 73 to transmission completion "1". In Act 67, the processor 11 changes the status data ST to "0" indicating not entering the store yet. Thereafter, the processor 11 returns to Act 1 and continues to wait for the wireless tag 30 to be read.

If the purchased commodity data is not finished being normally transmitted, the processor 11 determines NO in Act 86, skips the processing in Acts 87 and 67, and returns to Act 1. If purchased commodity data, the transmission completion flag F of which is set to non-transmission "0", is absent, the processor 11 determines NO in Act 84, skips the processing in Acts 85 to 87 and 67, and returns to Act 1. If the processor 11 fails in the line connection to the cart terminal 80, the processor 11 determines NO in Act 82, skips the processing in Acts 83 to 87 and 67, and returns to Act 1. If purchased commodity data is not stored in the purchased commodity memory 73, the processor 11 determines NO in Act 62, skips the processing in Acts 81 to 87 and 67, and returns to Act 1. If the status data ST is not "1", the processor 11 determines NO in Act 61, skips the processing in Acts 62, 81 to 87, and 67, and returns to Act 1.

In the second embodiment as well, the purchaser coming to the store attaches the commodity registration supporting device 10 near the wrist as illustrated in FIG. 4. The purchaser wearing the commodity registration supporting device 10 takes out the shopping basket 50 from a pile of the shopping baskets 50 stacked near the store entrance. In such an act of the purchaser, the commodity registration supporting device 10 reads the data of the store entry tag 31 with the wireless tag reader 17.

If the data of the store entry tag 31 is read by the wireless tag reader 17, display for instructing the purchaser to start shopping is performed in the commodity registration supporting device 10. Therefore, the purchaser confirming the display holds the shopping basket 50 and starts shopping. At this time, the purchaser places the shopping basket 50 on the cart attached with the cart terminal 80 and starts shopping. As in the first embodiment, the purchaser starting the shopping takes out commodities to be purchased from the shopping shelf 40 one by one and puts the commodities in the shopping basket 50. As in the first embodiment, the purchaser takes out a commodity to be returned before settlement from the shopping basket 50 and returns the commodity to the original shopping shelf 40. According to such an act of the purchaser, purchased commodity data of the commodities contained in the shopping basket 50 is stored in the purchased commodity memory 73.

For example, if the purchaser desires to confirm a total amount halfway in the shopping, the purchaser brings the commodity registration supporting device 10 close to the cart tag 36 attached to the cart terminal 80. Then, the data of the cart tag 36 is read by the wireless tag reader 17. The purchased commodity data in the purchased commodity memory 73 is wirelessly transmitted to the cart terminal 80 identified by the data of the cart tag 36. As a result, for example, as illustrated in FIG. 13, a list image of commodity names, the numbers of articles, and prices of purchased commodities up to the present point in time, a total number of articles, and a total amount are displayed on the display device 81 of the cart terminal 80. Therefore, the purchaser can easily confirm the total amount at the present point in time simply by bringing the commodity registration supporting device 10 close to the cart tag 36 halfway in the shopping.

The purchaser finishing the shopping brings the commodity registration supporting device 10 close to the cart tag 36 attached to the cart terminal 80 as explained above. Then, purchased commodity data not transmitted to the cart terminal 80 yet is wirelessly transmitted to the cart terminal 80. Therefore, purchased commodity data finally stored in the purchased commodity memory 73 is saved in the cart terminal 80.

The purchased commodity data saved in the cart terminal 80 is transferred to the POS terminal 20. In the POS terminal 20, as in the first embodiment, sales registration processing of commodities is executed based on the purchased commodity data.

In the second embodiment having such a configuration, as in the first embodiment, it is possible to provide the commodity registration supporting device 10 that can efficiently support commodity registration by the purchaser at low cost.

Modifications

Modifications of the embodiments are explained below.

In the embodiments, as an example, the commodity registration supporting device 10 is the wristwatch type and is attached near the wrist of the purchaser. The commodity registration supporting device 10 only has to be attached to an upper limb from a shoulder to a fingertip and able to detect the first act and the second act by the purchaser. For example, it is also possible to form the commodity registration supporting device 10 in a fingering shape and attach the commodity registration supporting device 10 to a finger of the purchaser.

In the embodiments, the purchase tag 34 and the commodity return tag 35 are provided in the shopping basket 50. The first act and the second act by the purchaser are detected by reading the data of the purchase tag 34 or the commodity return tag 35 with the wireless tag reader 17 of the commodity registration supporting device 10. Means for detecting the first act and the second act is not limited to this. For example, the commodity registration supporting device 10 of a wristband type incorporating a motion sensor such as an acceleration sensor, a gyro sensor, or a muscle potential sensor may be developed. The first act and the second act by the purchaser may be detected from information of the motion sensor.

In the embodiments, as an example, there is one purchaser. For example, in the case of a family, all family members wear the commodity registration supporting devices 10. In accounting, purchased commodity data stored in the purchased commodity memories 73 of the commodity registration supporting device 10 of all the family members are sequentially transmitted to the POS terminal 20. The POS terminal 20 executes sales registration processing based on the purchased commodity data received from the commodity registration supporting devices 10. Consequently, for example, it is possible to cope with even a family. A server may be provided between the commodity registration supporting device 10 and the POS terminal 20. The server may collect purchased commodity data and then transmit the purchased commodity data to the POS terminal 20.

In the embodiments, the transmitter is configured by the wireless tag 30. The transmitter is not limited to the wireless tag. The transmitter only has to be a transmitter that can transmit identification information of displayed commodities through short range wireless communication.

In the second embodiment, as an example, the transmission completion flag F is added to the purchased commodity data, and purchased commodity data, the transmission completion flag F of which is non-transmission, is transmitted to the cart terminal 80. Concerning this point, the cart terminal 80 may overwrite and save purchased commodity data transmitted from the commodity registration supporting device 10. Therefore, in Act 85, all purchased commodity data of the purchased commodity memory 73 may be transmitted to the cart terminal 80. In this case, the transmission completion flag F is unnecessary.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A commodity registration supporting device comprising:
   a receiver configured to receive a first electromagnetic wave transmitted from a first transmitter of a shelf label tag provided in a display configured to display a commodity; and
   a processor comprising:
      an acquiring section configured to acquire, from the first electromagnetic wave received by the receiver, identification information of the commodity;
      a first detecting section configured to detect a first act of a purchaser taking out the commodity from the display and storing the commodity in a storage body;
      an adding section configured to add the commodity identified by the identification information acquired by the acquiring section to a list in response to the first detecting section detecting the first act; and
      an output section configured to output the list.

2. The device of claim 1, wherein:
   the receiver is configured to receive a second electromagnetic wave transmitted from a second transmitter provided in the storage body; and
   the first detecting section is configured to detect the first act in response to receiving the second electromagnetic wave after receiving the first electromagnetic wave.

3. The device of claim 1, wherein the processor further comprises:
   a second detecting section configured to detect a second act of the purchaser returning the commodity stored in the storage body to the display; and
   a deleting section configured to delete the commodity identified by the identification information acquired by the acquiring section from the list in response to the second detecting section detecting the second act.

4. The device of claim 3, wherein:
   the receiver is configured to receive a radio wave transmitted from a third transmitter provided in the storage body; and
   the second detecting section is configured to detect the second act in response to the receiver receiving the first electromagnetic wave after receiving the radio wave.

5. The device of claim 1, wherein the device is configured to be attached to an upper limb of a purchaser.

6. The device of claim 1, further comprising a device display configured to display instructions for purchasing the commodity in response to receiving the first electromagnetic wave.

7. The device of claim 6, wherein the device display is configured to display a price of the commodity and a name of the commodity in response to receiving the first electromagnetic wave.

8. A commodity registration supporting method comprising:
   receiving a first electromagnetic wave transmitted from a first transmitter of a shelf label tag;
   displaying, by a display and in response to receiving the first electromagnetic wave, at least one of a name of a commodity or a price of the commodity;
   acquiring, from the first electromagnetic wave, identification information of the commodity;

detecting a first act of a purchaser taking out the commodity from the display and storing the commodity in a storage body;

adding the commodity identified by the identification information to a list in response to detecting the first act; and outputting the list.

9. The method of claim 8, further comprising:

receiving a second electromagnetic wave transmitted from a second transmitter provided in the storage body; and detecting the first act in response to receiving the second electromagnetic wave after receiving the first electromagnetic wave.

10. The method of claim 9, further comprising:

detecting a second act of the purchaser returning the commodity stored in the storage body; and deleting the commodity identified by the identification information from the list in response to detecting the second act.

11. The method of claim 10, further comprising:

receiving a radio wave transmitted from a third transmitter provided in the storage body; and detecting the second act in response to receiving the first electromagnetic wave after receiving the radio wave.

12. The method of claim 8, further comprising displaying instructions for purchasing the commodity in response to receiving the first electromagnetic wave.

13. The method of claim 8, further comprising displaying a price of the commodity and a name of the commodity in response to receiving the first electromagnetic wave.

14. A system for a display configured to store a commodity, the system comprising:

a first shelf label tag associated with the commodity, the first shelf label tag configured to transmit a first electromagnetic wave;

a storage body configured to store the commodity; and a device comprising:

a receiver configured to receive the first electromagnetic wave; and a processor comprising:

an acquiring section configured to acquire, from the first electromagnetic wave received by the receiver, identification information of the commodity;

a first detecting section configured to detect at least one of removal of the commodity from the display or insertion of the commodity in the storage body;

an adding section configured to add the commodity to a list in response to the first detecting section detecting the removal of the commodity from the display or insertion of the commodity in the storage body; and an output section configured to output the list.

15. The system of claim 14, wherein:

the storage body comprises a second tag configured to transmit a second electromagnetic wave;

the receiver is configured to receive the second electromagnetic wave; and the first detecting section is configured to receive the second electromagnetic wave before detecting at least one of removal of the commodity from the display or insertion of the commodity in the storage body.

16. The system of claim 14, wherein the processor further comprises:

a second detecting section configured to detect at least one of insertion of the commodity in the display or removal of the commodity in the storage body; and a deleting section configured to delete the commodity from the list in response to the second detecting section detecting at least one of insertion of the commodity in the display or removal of the commodity in the storage body.

17. The system of claim 14, wherein the device is configured to be attached to an upper limb of a purchaser.

* * * * *